(No Model.) 2 Sheets—Sheet 1.
T. CARROLL.
LOAD DUMPING APPARATUS.
No. 595,236. Patented Dec. 7, 1897.
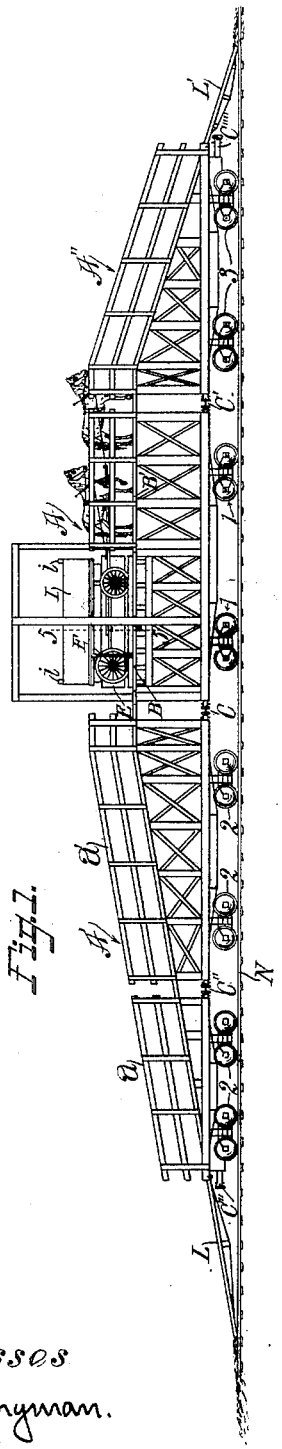
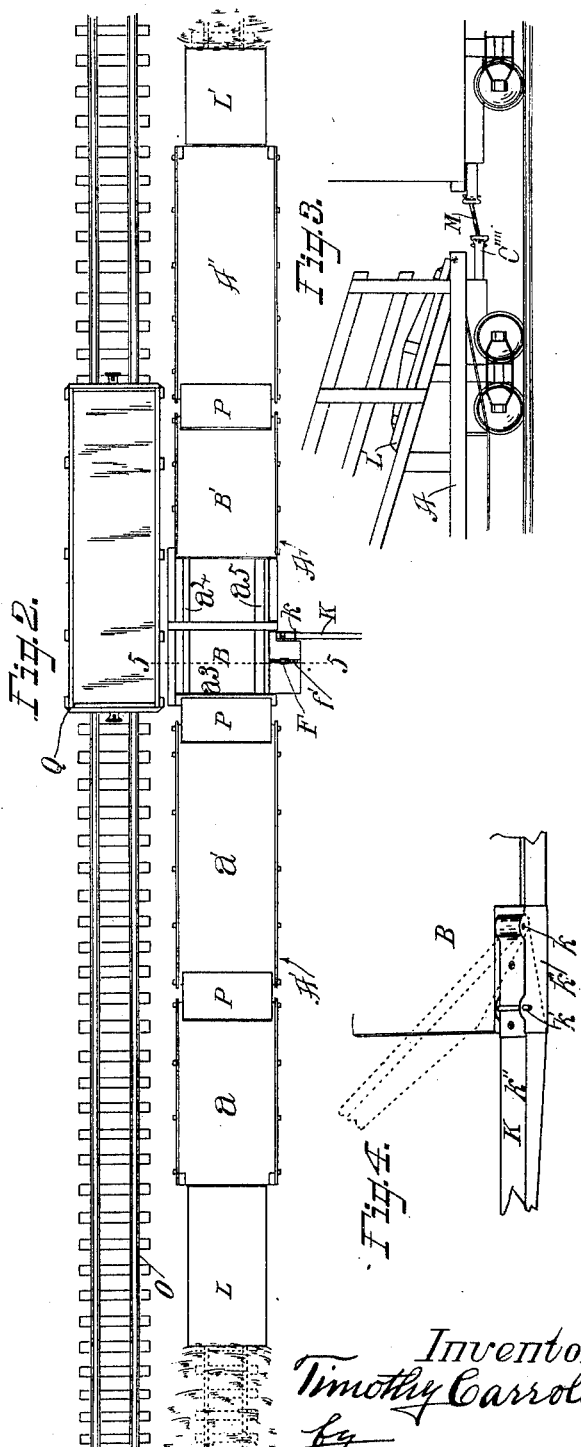
Witnesses
Perry Kingman
Alfred I. Townsend
Inventor
Timothy Carroll
by
Hazard Townsend
attys.

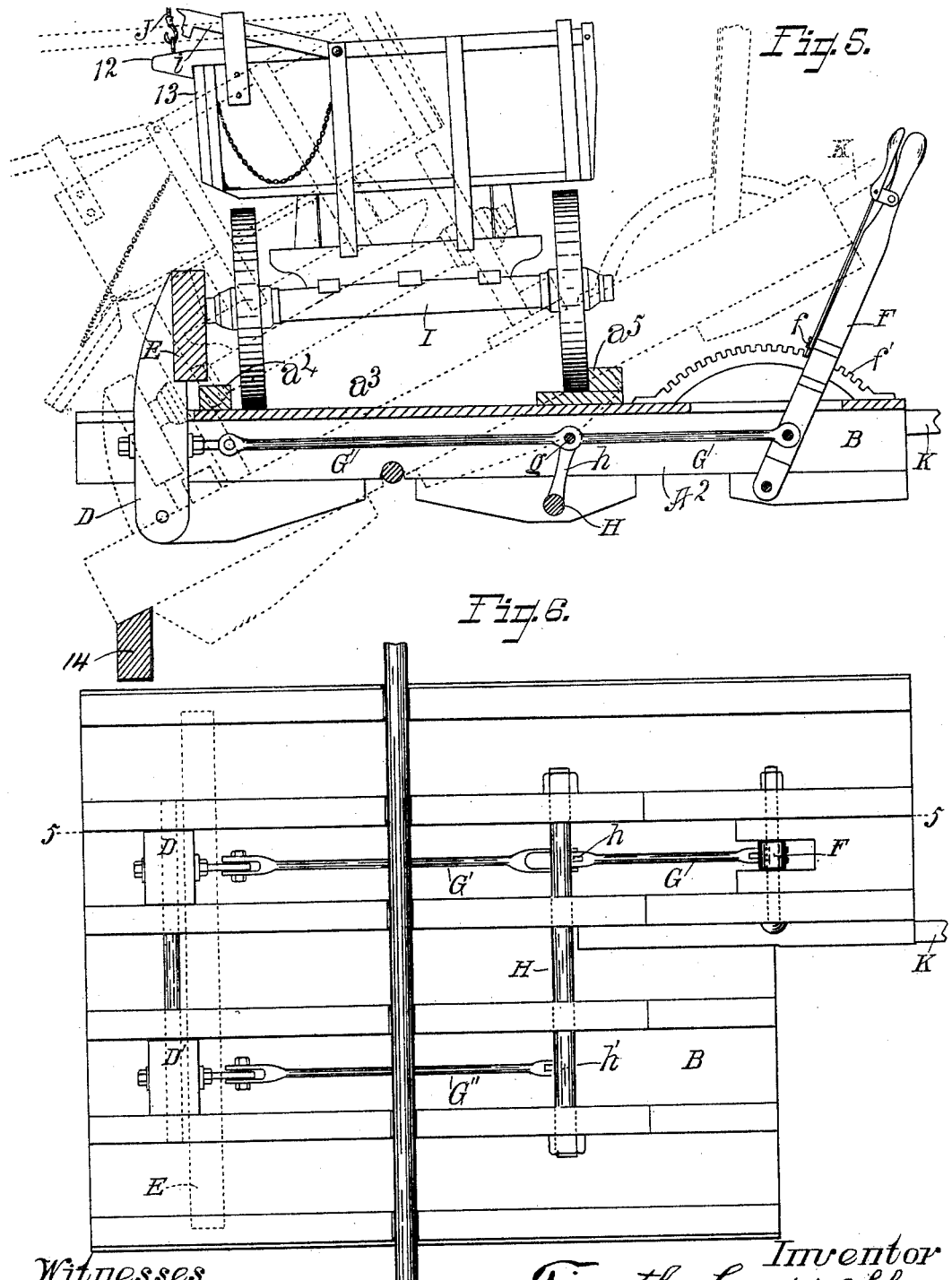

United States Patent Office.

TIMOTHY CARROLL, OF ANAHEIM, CALIFORNIA.

LOAD-DUMPING APPARATUS.

SPECIFICATION forming part of Letters Patent No. 595,236, dated December 7, 1897.

Application filed November 18, 1896. Serial No. 612,619. (No model.)

*To all whom it may concern:*

Be it known that I, TIMOTHY CARROLL, a citizen of the United States, residing at Anaheim, in the county of Orange and State of California, have invented new and useful Improvements in Load-Dumping Apparatus, of which the following is a specification.

My invention includes in a dumping apparatus for dumping a vehicle sidewise a holder carried by the tilting vehicle-supporting platform at a height to engage the hubs or ends of the axles of the vehicle and means for moving the holder to and from the hubs or axle ends, so that when the vehicle is moved onto the tilting platform the holder can be moved against the hubs or axle ends on the side toward which the platform tilts, and then when the platform is tilted the sidewise strain is borne by the axles, and lateral movement of the vehicle is prevented. Then when the vehicle has been emptied and returned to upright position the holder can be moved away from the hubs or axles ready for another vehicle. I have found by practical tests that this holder, carried by the tilting vehicle-supporting platform and brought against the ends of the axle or against the hubs of the wheel, is perfectly effective for holding the vehicle during the dumping process, and this application of the holder is far superior to holders which apply against the bed of the vehicle to support the bed, for the reason that the movement of the holder into its supporting position and out of the path of the vehicle is much less with wagons than is necessary where the holder is made to engage the vehicle-bed, and the holder is brought closer to the tilting platform and therefore can easily be given the required strength without being made cumbersome and is nowise in the way of the dumping load, but is entirely below the vehicle-bed and the path of the load as it passes out of the vehicle. This arrangement is adapted for railway-cars as well as for wagons.

This invention relates to dumping apparatus for dumping wagon-loads and car-loads of material sidewise, and involves improvements upon the dumping apparatus shown and claimed in Letters Patent of the United States No. 561,485, granted to me June 2, 1896.

One object of this invention is to provide a dumping apparatus which can be conveniently transported by railway from station to station along the line, so that the expense of erecting a separate dump at each station may be done away with. This is especially desirable in loading beets and other crops which are delivered to the railroad by the growers at stations along the line, it often being the case that the amount to be shipped from one station is not sufficient to justify the building of a dumping apparatus at that station, and it often being the case (especially with beets) that the crop of one section of the country can all be harvested and shipped at one point before it is necessary to harvest at another point, so that the shipments can be made at one station until the total produce of that station has been shipped and then shipments be made from another station, and so on from station to station until the campaign is over.

Another object of my invention is to increase the facility with which the loaded vehicle, whether a railway-car or a wagon or any other vehicle, as the case may be, can be held stationary upon the dumping-platform while the load is being dumped.

By this invention the rapidity with which the work can be done is increased. It includes the combination of a vehicle-dumping frame which is pivoted on a fixed axis to tilt sidewise and is provided with means for dumping and returning of a vehicle-holder carried by a lever which is pivoted to the frame and is arranged to move the holder toward and from the vertical axial plane of the frame, and means carried by the frame for operating and holding the said lever. In my said patented dump a stop is arranged to stop the tilting platform and hold it aslant, and my present dump is of the same character in this respect and does not relate to dumps which roll or revolve.

My invention consists in the apparatus, combinations, and parts herein shown, described, and claimed, and I have set forth the best form in which I propose to carry out my invention, but I do not limit myself to the exact form shown, as it is obvious various modifications can be made without departing from the spirit of my invention.

The accompanying drawings illustrate my invention.

Figure 1 is a side elevation showing my newly-invented dumping apparatus ready for operation. A wagon and team are shown in position for dumping a load. Fig. 2 is a plan of the apparatus with a car on a track by the side of the apparatus. Fig. 3 is a fragmental detail of the end of one of the inclines coupled to a car. Fig. 4 is a fragmental detail of the hinge of the dumping-lever. Fig. 5 is a cross-sectional elevation on line 5 5, Figs. 1 and 2. The wagon is shown. Dotted lines indicate dumping position in which the dumping-frame is held when stopped by the stop. Fig. 6 is a view of the under side of the dumping-platform shown in Fig. 5.

The drawings show a dumping apparatus composed of a dumping-section A, mounted on trucks 1 and provided with a tilting platform B, operative means for tilting the platform sidewise, and means for holding a vehicle on said platform, two inclines A' A", mounted on trucks 2 3 and respectively arranged for the opposite ends of the dumping-section, and couplings for coupling the inclines to the dumping-section.

The descending incline A" can be at a very steep angle, but the approach incline A', up which the loaded vehicles will be drawn, must be of a more gradual slope, (about one in eight, for example,) and since the height of the dumping frame or platform B is ordinarily about twelve feet the said approach A' must be made of considerable length, and I have shown it in two sections coupled together. Couplings C C' are provided for coupling the inclines to the dumping-section, and the sections $a$ $a'$ of the approach A' are coupled together by couplings C".

My invention also comprises the combination of a vehicle-dumping frame or platform B, pivoted to tilt sidewise, a lever D, pivoted thereto below the top thereof, a holder E, carried by the lever, means for moving the lever to throw the holder against a vehicle on the dumping-frame, and means for holding the holder stationary.

The means which I have shown for moving the lever to throw the holder against the vehicle on the dumping frame or platform comprises a holder-operating lever F, pivoted to the frame and extending above and below the top of the platform, and suitable connections connecting the operating-lever with the holder-carrying lever D. A ratchet $f$ and segmental rack $f'$ serve to hold the lever F in any position. The connection between the lever F and the holder-lever D is preferably composed of a connecting-rod, which may be in one or more sections.

G G' indicate a rod in two sections pivoted together at $g$. Preferably two holder-levers D and D' are employed, one at each end of the dumping-frame, and the buffer E is fastened to and carried by both of these levers.

H indicates a rocking beam having two arms $h$ and $h'$, located at distances apart to correspond with the levers D and D', and these arms are respectively connected with the levers D and D' by the connecting-rods G' and G", so that the rocking beam when rocked by the operating-lever F and rod G will operate the rods G' and G" simultaneously.

The dumping-frame has a suitable track thereon. In case railway-cars are to be dumped the track will be a railway-track; but dumps which are to be used for wagons or other road-vehicles will have a track suitable for such vehicles. In the drawings the track is indicated by $a^3$ between guide-rails $a^4$ and $a^5$. The rail $a^5$ is intended to engage the outside of the wheels which are on one side of a vehicle on the dump. I indicates such vehicle. The operating-lever F is on the side of the track opposite the holder E, and the tilting lever K is on the same side of the dumping-platform with lever F, and in practice when the driver of a vehicle drives the vehicle onto the dumping-platform he preferably takes care that the wheels are brought close to or against the clamp-rail $a^5$. Then the dumper will throw the lever F to draw the holder E against the hubs of the vehicle-wheels. Then the ratchet $f$ is allowed to enter the rack $f'$, and the dumping-frame is then ready to be tilted. In the meantime an attendant will have raised the end catches $i$, which hold the hinged side of the vehicle, and the rope or cord J will then be fastened to the middle latch 12, and the vehicle is ready to be dumped. The dumper will then raise the dumping-lever K, thus tilting the platform and wagon, the hinged side 13 will be withdrawn from the catch 12, and the load will be dumped. The stop 14 prevents the platform from tilting too far and holds it aslant until the lever K is returned to the horizontal position. The holder E being brought firmly against the wheel, as indicated in Fig. 5, will hold the vehicle in position while the dumping is being accomplished and will return the vehicle to upright position when the frame is again brought to the horizontal position.

The dumping-lever K is fastened to the dumping-frame, being hinged at $k$, so that it will fold over onto the dumping-frame to be out of the way when the apparatus is to be moved along the railway.

$k'$ indicates a pin for fastening the folding section $k''$ of the dumping-lever in its lowered position.

$k'''$ indicates a socket into which the dumping-lever fits when it is in its extended position ready for work, and the pin $k'$ holds the lever in such socket.

L L' indicate flaps or aprons hinged to the lower ends of the inclined sections to fold thereupon when the apparatus is to be transported along the railway-track. When swung down to the ground, these aprons enable the teams to be driven up onto and down off from the inclines.

C''' C'''' indicate couplings for coupling the inclines to a train, so that the apparatus can be drawn along the track with a train of cars. A long coupling-bar M may be provided for making connection between the low drawheads at C''' C'''' and the rest of the train.

In practice when it is desired to load cars at any station the apparatus (coupled together) will be coupled to an engine or to a train of cars and drawn to the station where the products are to be loaded and there sidetracked upon a side-track N especially prepared for the purpose by the side of the side-track O, on which the cars Q to be loaded will be placed. Then the aprons L L' are let down, and the rails of the side-track N may be banked over with earth at each end of the inclines, so as to make a good approach to the inclines. The lever K will then be thrown out into its extended position and fastened by the pin k'. The wagon-loads of beets or other products or material to be dumped will be driven up the long incline onto the dumping-frame or platform, and when in position the holder-operating lever F will be moved by the attendant to draw the holder against the hubs of the wagon. After the end latches on the wagon have been thrown back and the cord J for releasing the middle latch is adjusted, then the lever K is lifted by the attendant, and the platform is tilted and the load dumped. It is then returned to the horizontal position, the dump side of the vehicle is brought into upright position and fastened by the latches, the latch-releasing cord detached from its latch, and the team and wagon are then driven down the descending incline.

The dumping-section shown in the drawings is provided with the tilting platform B and a solid platform B' of sufficient length to afford standing-room thereon for the horses while the wagon on the tilting platform is being dumped.

P indicates plates hinged to the several sections of the dump to bridge the spaces between these sections.

Now, having described my invention, what I claim as new, and desire to secure by Letters Patent, is—

1. The combination of a pivoted vehicle-dumping frame pivoted on a fixed axis to tilt sidewise; a stop to hold the frame aslant; a lever pivoted to the dumping-frame; a holder carried by the lever; means for moving the lever to throw the holder against the side of a vehicle on the dumping-frame; and means for holding the holder stationary.

2. The combination of a vehicle-dumping frame having a track thereon and pivoted to tilt sidewise; a lever pivoted to the frame at one side thereof and projecting above the same; a holder carried by the lever; an operating-lever pivoted to the frame; a rod connecting the holder-lever with the operating-lever; and means for holding the operating-lever.

3. The combination of a vehicle-dumping frame pivoted to dump sidewise; two levers pivoted to the frame below the top thereof and extending above the top of the frame; a holder fastened to the upper ends of the levers; a rocking beam pivoted to the under side of the frame and provided with two arms; connecting-rods connecting the arms with the levers; an operating-lever pivoted to the frame and extending above and below the top thereof; a connecting-rod connecting the operating-lever with the rocking beam to operate the same; and means for holding the operating-lever.

4. The dumping-section with trucks; the incline sections with trucks and coupled to the dumping-section; flaps or aprons at the lower ends of the inclines; and bridges for the spaces between the sections.

5. The combination with a vehicle-dumping frame which is pivoted on a fixed axis to dump sidewise and is provided with means for dumping and returning, of a vehicle-holder carried by a lever which is pivoted to the frame and is arranged to move the holder toward and from the vertical axial plane of the frame, an operating-lever carried by the frame and connected with the holder-lever for operating the holder-lever and means for holding the said operating-lever.

6. A dumping apparatus comprising a tilting vehicle-supporting platform which is pivoted to tilt sidewise and supports the vehicle; means for tilting said platform sidewise; a stop for holding the platform aslant; a holder carried by the tilting platform and arranged at the height of the vehicle-hubs to engage the hubs or ends of the axles of the vehicle on the platform; and means for moving the holder to and from the hubs or axle ends.

7. In a dumping apparatus for dumping a vehicle sidewise, a holder carried by a tilting vehicle-supporting platform at a height to engage the hubs or ends of the axles of the vehicle on said platform, and means for moving the holder to and from the hubs or axle ends.

TIMOTHY CARROLL.

Witnesses:
   JAMES R. TOWNSEND,
   JACOB EVERHARDY,
   JOSEPH HELMSEN.